United States Patent

[11] 3,562,440

[72] Inventor William C. Broekhuysen
New York, N.Y.

[21] Appl. No. 639,175
[22] Filed May 17, 1967
[45] Patented Feb. 9, 1971

[73] Assignee G-V Controls Inc.
Livingston, N.J.
a corporation of New Jersey

[54] AUTOMATIC TELEPHONE DIALING APPARATUS
16 Claims, 9 Drawing Figs.

[52] U.S. Cl. .......... 179/90
[51] Int. Cl. .......... H04m 1/38
[50] Field of Search .......... 179/90, 9 (BD), 90B

[56] References Cited
UNITED STATES PATENTS
3,135,834 6/1964 Saburo Shoji et al. ........ 179/90

*Primary Examiner*—Kathleen H. Claffy
*Assistant Examiner*—Tom D'Amico
*Attorney*—Charles T. Jacobs

ABSTRACT: A single-address automatic telephone pulse-dialer employs a rotatable member with arcuately arranged indices; an electrical circuit connectable to the telephone line is opened and closed once per index passage past a reference position, and means coupled to the rotatable member suspend the switching while preselected groups of successive indices pass that position.

INVENTOR
WILLIAM G. BROEKHUYSEN
BY [signature]
ATTORNEY

PATENTED FEB 9 1971

3,562,440

SHEET 2 OF 3

INVENTOR
WILLIAM C. BROEKHUYSEN

BY [signature]

ATTORNEY

INVENTOR
WILLIAM C. BROEKHUYSEN
BY Charles C. Jacobs
ATTORNEY

AUTOMATIC TELEPHONE DIALING APPARATUS

This invention relates to Automatic Telephone-Dialing Apparatus, and more particularly to such apparatus for pulse dialing, typically of a single telephone address, in response to a single operation (for example the momentary depression of a button) by the calling party.

For telephone dialing in response to a single operation, both by pulses and by tones, there are known wholly electrical systems which, when a substantial number of addresses are to be selectively dialed, are unquestionably simpler and more economical than any electromechanical systems that can be foreseen. I have observed, however, that when the requirement is the dialing of a single address, an electromechanical approach offers significant advantages of simplicity and economy. The present invention comprises such an approach, in which the generation of the pulses is under the control of a rotatable member.

For most purposes adjustability, or preselection, of the address to be dialed is a prerequisite. In providing for such preselection I have observed that significant advantages—among them, completion of the dialing with the maximum dispatch—may be achieved if the preselection be of the location, in a fixed total series of pulses, of the positions of the required interdigital intervals of absence of pulse. Each of the intervals may for example be of a uniform short length; provision may be made for the suppression of excess pulses in the series remaining after the completion of the required ones, and during the interval of this suppression the telephone line may be made available for the purposes of the call. My invention achieves these and other desirable results.

In known electromechanical approaches to pulse dialing the included rotatable member, or the motor which rotates it, is typically used for the mechanical actuation of the circuit-opening-and-closing switch. I have observed, however, that greater simplicity, economy and durability may be achieved if the circuit-opening-and-closing switch be actuated by an electrical system, and the rotatable member relied on only for command of that system. The preferred embodiments of my invention operate in the latter manner.

In a typical embodiment of my invention there are provided a rotatable member, means for rotating it, a series of uniformly spaced indices arcuately arranged on that member, an electrical circuit connectable to the telephone line, switching means once per passage of one of the indices past a fixed reference position, and a plurality of means coupled to the member each for rendering the means for operating the switching means ineffective throughout the passage of a respective preselected group of indices past the reference position thereby to provide the interdigital intervals. There may be limited to 360° the member rotation occurring in response to the initiating operation.

Each of the groups of indices above-mentioned may be of a uniform small number of indices. A means may be provided which is actuable during the member rotation to render the means for operating the switching means ineffective during the member's further rotation, and means coupled to the member may actuate that actuable means sufficiently subsequently to the operation of the last-to-act of the above-mentioned plurality to provide for the pulses of the last digit. To provide for the preselection the couplings of each of the plurality of means to the rotatable member may be made angularly variable, as may also be the coupling of the actuating means mentioned in the preceding sentence.

The plurality of means above-mentioned may comprise a plurality of generally disc-shaped elements arranged in a stack, and the active portion of each element may be a radially extended arm of short arcuate length. Indicia may be provided on each of those elements, so arranged that that indicium on each element (other than the last-to-act element) which appears in a predetermined relationship to the next-to-act element will provide an indication of the number of pulses which will occur between the interdigital intervals respectively commanded by those two elements. Similar indicia may be provided on the rotatable member and read against the first-to-act element to provide a similar indication with respect to the pulses of the first digit, and the indicia on the last-to-act of the interdigital elements may be read against the above-mentioned actuating means to provide a similar indication with respect to the pulses of the last digit.

In a preferred embodiment of my invention the means for operating the switching means may comprise a monostable multivibrator controlling the switching means, and means rendered effective by the rotatable member once per passage of one of the indices past the above-mentioned reference position for triggering the multivibrator. In a slightly different aspect the means for operating the switching means may comprise a light-responsive element controlling the switching means, and means for illuminating that element, the rotatable member including a shield between that element and the illuminating means and that shield being provided with a series of apertures uniformly spaced from each other; in this aspect each of the above-mentioned plurality of means may comprise a vane covering a respective small group of successive apertures.

Allied and other objectives and aspects of my invention will appear from the following detailed description and the appended claims. In that description reference is had to the accompanying drawings, in which:

Figure 1:
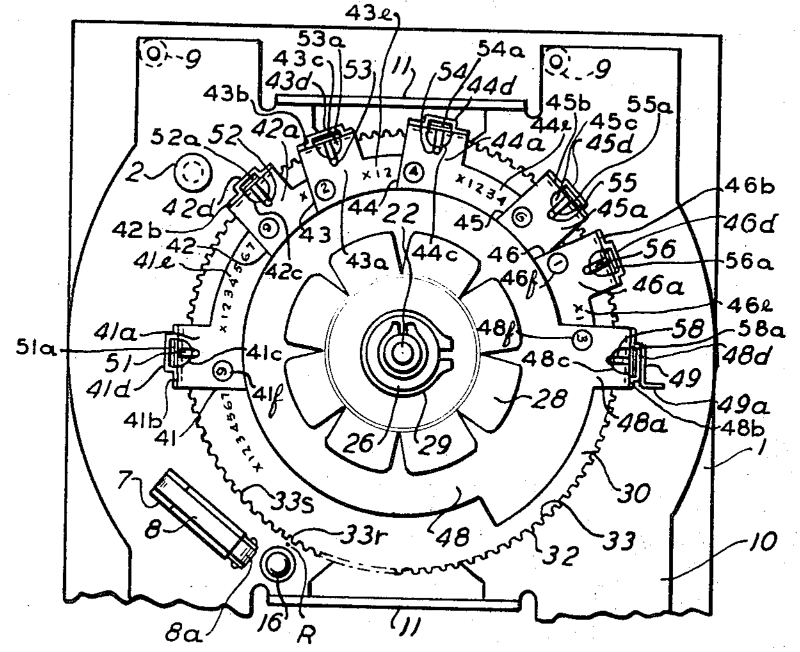
FIG. 1 is a plan view of the mechanical organization of a preferred embodiment of my invention.

The mechanical organization of a preferred embodiment of my invention may first be described, with reference to FIGS. 1 through 5 of the drawings. A base for the apparatus may be provided in the form of a metallic deck 10, of which the central portions of the front and back edges may be folded upwardly to form flanges 11 by which the apparatus may be mounted in its environment. Secured below the deck 10 in spaced relation thereto, as by pillars 9, may be rectangular board 1 of insulating material on which various electrical elements and circuitry hereinafter referred to may be mounted.

A motor 20 having a shallow reduction-gearbox 21 integral therewith is mounted to the bottom of the deck 10 with the gearbox disposed in the space between deck 10 and board 1, and with the motor proper extending downwardly from 21 through a suitable large aperture in the board 1; the output shaft 22 from the gearbox 21 freely protrudes upwardly through a suitable small aperture in the deck 10. Onto the shaft 22 closely but freely above the deck 10 there is secured, by means of set screw 23, an inverted T-cross section hub 24; fitting immediately around the vertical portion and immediately above the horizontal portion of the hub 24 is an inverted T-cross section collar 26, angularly located with respect to 24 by a pin 25 and retained in position by a spring C-ring peripherally inset into 24 near the top of the latter.

Fitting around the vertical portion of the collar 26 is a centrally apertured large flat gear 30 having teeth 32 and intertooth valleys 33, the bottom of the gear 30 being secured to the top of the horizontal portion of 26 by means of screws 31. The peripheral portion 30a of the bottom of the gear 30 may be slightly recessed upwardly, and into the recess thus formed there may be fitted a thin flat ring 36 held to the gear 30 as by rivets 37. At its periphery the ring 36 may be formed downwardly into a cylindrical flange 35, and that flange may be provided throughout most of its periphery with a series of narrow apertures 34 each angularly spaced from its predecessor by the same angular spacing as exists between the gear teeth 32. The apertures 34 will of course be in some predetermined angular relationship to the teeth 32; permissibly—and as illustrated for purposes of simplest description—that relationship may be one of radial alignment, each aperture then being located vertically below a respective tooth.

On top of the gear 30 there is provided a stack 40 of generally disc-shaped elements centrally apertured to fit around the vertical portion of the collar 26, the stack being held in position vertically by a spring star washer 28 whose periphery bears down on the top one of the elements and whose central aperture fits about the vertical portion of 26, the washer 28 there bearing upwardly against a spring C-ring 29 peripherally inset into 26. All except the top one of the elements in the stack may be structually indentical to each other—six of them being shown, consecutively numbered from 41 through 46 (except in FIG. 5, wherein for simplicity only the bottom one 41 appears) and they may be described in terms of the bottom element 41.

The generally disc-shaped element 41 is provided, through an angular peripheral space equal to a small multiple (typically, four) of the intertooth angular spacings of the gear 30, with an arm 41a radially extended in the plane of the main portion of 41 to slightly beyond the outer limit of gear 30 (which is slightly beyond the cylindrical flange 35) and there folded downwardly to form a vane 41b opposite the flange 35. Starting at the fold between 41a and 41b there is cut in those portions a central notch or aperture 41c, which may extend almost to the bottom of 41b but only a short distance into 41a. To the bottom part of the outer surface of the vane 41b there may be secured the bottom part of a generally triangularly shaped spring 52a whose upper portion is positioned opposite the notch 41c, and to the inner surface of that upper spring portion there may be secured the lower portion of a generally vertical pin 51; that lower pin portion will be disposed within the notch 41c, but the upper portion of the pin will project upwardly beyond the plane of 41a and 41 to be manually accessible. Normally the pin 51 in response to the urge of spring 51a will lie in one of the valleys of the gear 30; by manual outward displacement of the pin 51, however, it may be disengaged from the gear 30, whereupon the element 41 may be rotated to bring the pin 51 to a position opposite some other valley 33—and upon manual release of the pin it will enter that other valley. A stirrup 41d may be secured to the upper portion of the outer surface of the vane 41b, straddling the notch 41c, to guard against excessive manual displacement of the pin 51 which might result in breakage of spring 51a. Obviously the valleys 33 of the gear 30 form detents defining the angular relationships in any of which the element 41 may be coupled to the gear 30, and the pin 51 constitutes a detent-engaging means by which such coupling is effected.

Each of the further five elements 42 through 46 (each of which is provided with a detent-engaging pin designated by a numeral higher by 10 than the numeral designating the element) may be identical to the element 41; the designations of the portions of those further elements are similar, except for difference of the basic numeral, to those for corresponding portions of 41.

The top element 48 (provided with the detent-engaging pin 58) may, with two exceptions to be noted, also be similar to the element 41, and its portions have been designated in a corresponding manner to that just stated for elements 42 through 46. One of the exceptions just mentioned is the incorporation in 48 of a bracket 49 having one leg secured against the central portion of the stirrup 48d and having its other leg 49a extending in a vertical plane for a short distance radially outwardly.

Two electrical switches functionally associated with the mechanical organization may next be described. One of these is a "dialing completion" switch 7 operated at the appropriate time by the bracket leg 49a just mentioned; this switch (which may be at least fractionally seen in each of FIGS. 1, 2 and 3) may be an enclosed switch mounted on the board 1, extending upwardly through a suitable aperture in the deck 10, and having at its top a lever 8 which carries at its free extremity a roller 8a—the switch being temporarily thrown away from its normal to its opposite condition by a small downward displacement of the roller 8a which results from a temporary presence of the bracket leg 49a immediately over the roller.

The other of the two switches just mentioned is a "run" switch 5 operated at the appropriate time by a small projection 4 (see FIG. 5) extending downwardly from the ring 36; this switch (which may be at least fractionally seen in each of FIGS. 2 and 4) may also be an enclosed switch, mounted correspondingly to switch 7 and having at its top a lever 6 carrying the roller 6a—the switch being thrown away from its normal to its opposite condition by the small downward displacement of that roller which results from a presence of the projection 4 over the roller.

The angular positionings of the two switches 5 and 7 are of importance and are hereinafter dealt with. A third switch, whose positioning is not of importance other than as a matter of convenience, is also to be seen in FIG. 3 (and fractionally in FIGS. 1 and 2 as well); this is a "start" switch 3. It may comprise a plunger 2a passing freely through a suitable hole in the deck 10 and below that deck having an enlarged bottom portion 2b; a start button 2 at the top of the plunger; a coiled expansion spring 2c surrounding the plunger between button 2 and deck 10 and urging the plunger upwardly; a conductive washer 3a peripherally secured about the plunger bottom portion 2b; and a pair of contacts 3b secured in the insulating board 1 below the washer 3a, which contacts will be interconnected through the washer when the latter is brought downwardly into contact with them by manual pressure on the button 2.

Figure 2:
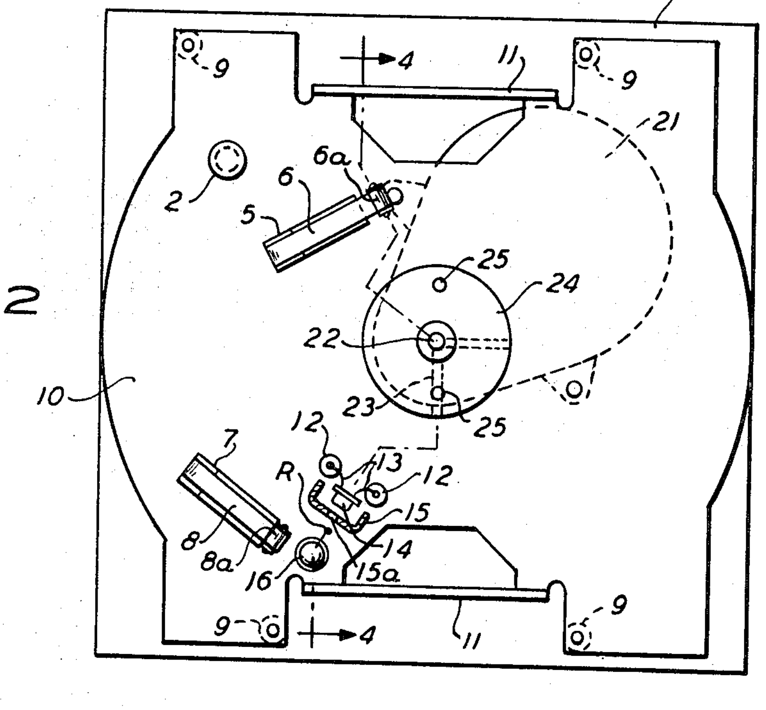
FIG. 2 is a similar view but with the collar 26 and the rotatable member thereby carried removed.
Figure 3:
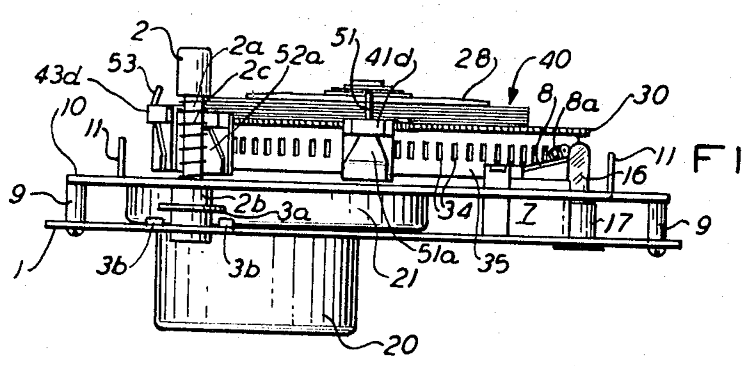
FIG. 3 is a view as seen looking at the structure of FIG. 1 from the left.
Figure 5:
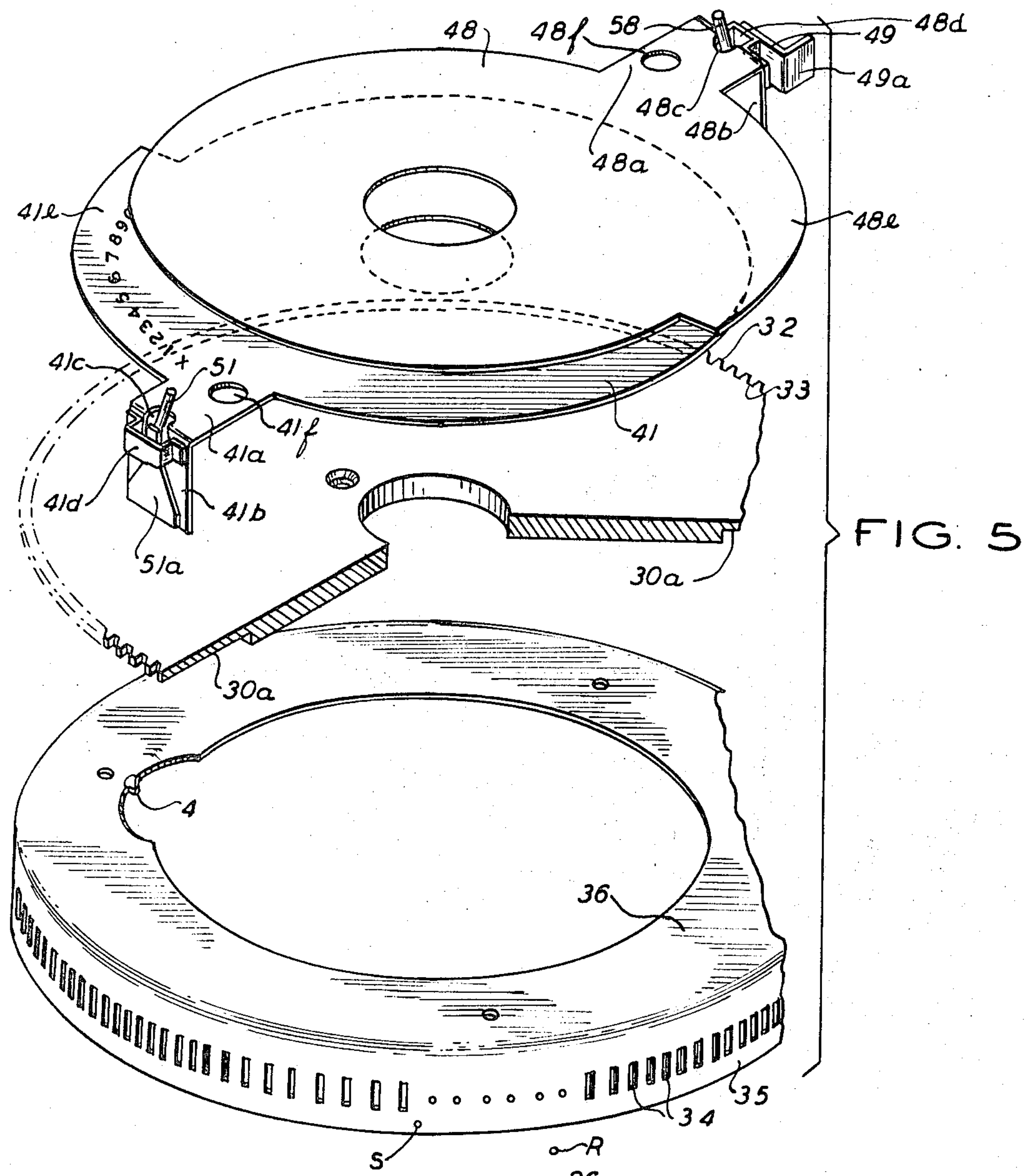
FIG. 5 is an exploded view of the rotatable member 30—36—35 and certain of the elements thereby carried.
Figure 4:
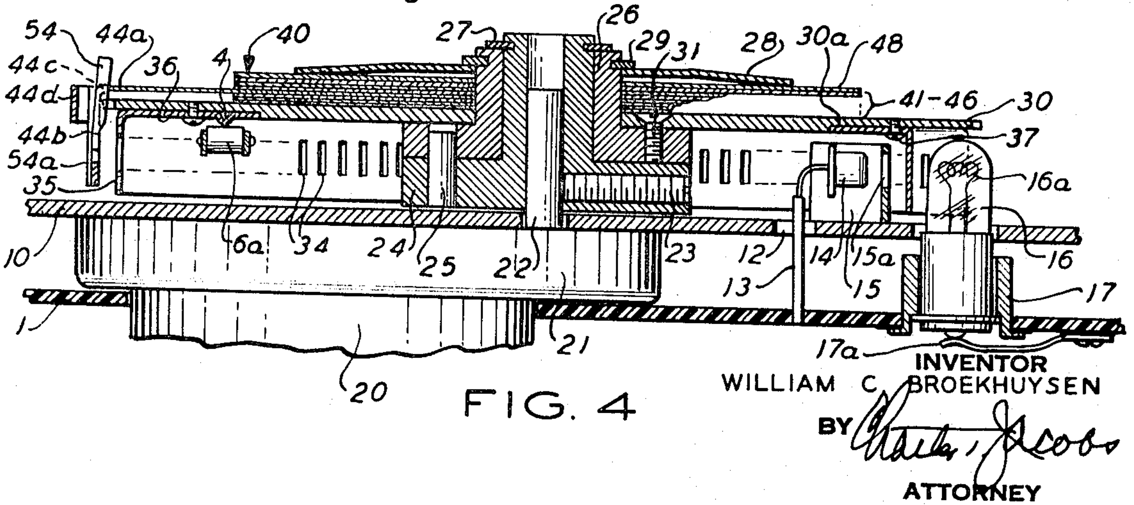
FIG. 4 is a vertical cross-sectional view taken along the line 4—4 of FIG. 2 (but including the elements removed from that FIG.)

The remaining basic components of the mechanical organization of FIGS. 1 through 5, best seen in FIGS. 2 and 5, are a light-sensitive element 14 disposed above the deck 10 and a little inwardly of the cylindrical flange 35, and a lamp 16 having the center of its filament 16a disposed above the deck 10 and a little outwardly of flange 35 and in radial alignment with the center of the light-sensitive element 14—the apertures 34 in the flange 35 being approximately centered vertically at the levels of the centers of 14 and of 16a. The lamp 16 may be retained, in a socket 17 appropriately secured to the insulating board 1, by a contact spring 17a also appropriately secured to that board. The element 14 may be secured by its two terminal leads to respective conductive posts 13 extending upwardly from the board 1 through respective apertures 12 in the deck 10; it may be supplemented by a light guard 15 intervening between it and the flange 35 and provided with a narrow vertical slot 15a, in radial alignment with the center of 14, to limit its light reception to reception only of vertical "sheets" of light reaching it from the lamp 16. When the gear 30, ring 36 and flange 35—which collectively may be considered a rotatable member—are undergoing rotation by the motor 20 then, unless specially interfered with, a sheet of light from the lamp 16 will impinge briefly on the element 14 each time one of the apertures 34 in the cylindrical flange 35 comes into radial alignment with 14, 15a and 16. The above-described vanes 41b through 46b, while passing between the lamp 16 and the light-sensitive element 14, provide such special interference. A point R appearing in FIG. 1 on the deck 10 adjacent the periphery of the gear 30 will lie under the path of the sheets of light above described, and is taken as a reference point in the further description.

The rotary member 30—36—35 has a "rest" or zero position, in which it has been illustrated in FIGS. 1 through 5, wherein by way of example a particular valley 33r on the gear 30 has been shown as radially aligned with the reference point R. As best seen in FIG. 5, the continuity of the series of apertures 34 (which would be endless if there were as many apertures as gear teeth) may be broken by the omission of a limited number of consecutive apertures, as shown by the dots appearing on flange 35 in FIG. 5 in the positions which would be occupied by apertures if there were a full complement thereof; typically, and as illustrated, the number of omitted apertures is six. When the member 30—36—35 is in its zero position the peripheral portion of the flange 35 from which the apertures are omitted may angularly embrace the reference point R; as illustrated by way of example (see FIG. 5, in which the position of the reference point R is also shown) the positions of five of the omitted apertures may then be disposed clockwise, and that of one may then be disposed counterclockwise, from the point R. It is convenient, in view of the five apertures omitted in the clockwise direction from R, to denote as 33s that gear valley which is spaced clockwise from 33r by five intervening gear teeth, and as S (in FIG. 5) the point on the flange 35 aligned with that valley 33s.

In the further description it is assumed that the direction of rotation of the member 30—36—35 is counterclockwise, and the apertures 34 are considered as indices which successively pass past the reference point R (which is adjacent their locus of travel); extensive reference will be made to FIG. 1, wherein those indices themselves do not appear—but since for purposes of description those indices have already been disclosed as typically disposed under respective gear teeth, their dispositions may be directly inferred from those of the teeth.

In description hereinafter presented of typical electrical apparatus to be used with the mechanical organization of FIGS. 1 through 5 there will be disclosed:

1. an electrical circuit by the repetitive opening of which dialing may be effected, and switching means connected therein for opening and closing that circuit once per passage of one of the indices 34 past the reference point R (accomplished in response to each onset of impingement of a sheet of light from lamp 16 onto element 14, 16 and 14 forming the action-initiating portions of that switching means);

2. connections of the start and run switches 3 and 5 such that after momentary depression of the start button 2 the motor will rotate the member 30—36—35 from its zero position through 360°; and 3. a connection of the dialing-completion switch 7 such that a temporary throw thereof to opposite-from-normal condition will render the switching means mentioned in (1.) above ineffective to open the above-mentioned circuit during the further rotation of the member 30—36—35.

The further description of the mechanical organization of FIGS. 1 through 5 will be presented with those functions taken into account. It may at once be mentioned that the zero position is one in which the rotatable member 30—36—35 has brought the projection 4 (seen in FIGS. 4 and 5) immediately over the roller 6a (seen in FIGS. 2 and 4) so as to have thrown the run switch 5 to opposite-from-normal condition (herein lying the significance of the angular positioning of that switch).

The bottom (which will be the first-to-act) disc-shaped element 41 may be angularly positioned, relative to the rotatable member 30—36—35, so as to separate its vane 41b from the point S on flange 35 by a clockwise angular spacing which will leave exposed between that vane and that point as many apertures 34 as there are pulses in the first of the digits to be dialed; assuming the first digit to comprise nine pulses, this positioning of the element 41 may be seen from FIG. 1—taking the arm 41a in substitution for the vane 41b, the valley 33s in substitution for the point S, and the intervening teeth in substitution for the above-mentioned apertures. The next (which will be the second-to-act) element 42 may be angularly positioned so as to separate its vane 42b from the vane 41b by a clockwise angular spacing which will leave exposed between those two vanes as many apertures 34 as there are pulses in the second of the digits to be dialed—and so on up to and including the sixth element 46 (which will be the last-to-act of the six elements 41 through 46). And, correspondingly, the top element 48 may be angularly positioned so as to separate its vane 48b from the vane 46b by a clockwise angular spacing which will leave exposed between those two vanes as many apertures 34 as there are pulses in the seventh (which in the illustrated embodiment is the last) of the digits to be dialed. As may be seen from FIG. 1, it has been arbitrarily assumed in the illustration that the sequence of numbers of pulses to be dialed is 9–9–2–4–6–1–3.

An operation of the embodiment illustrated in FIGS. 1 through 5 may now be described. The apparatus being in rest condition (with the valley 33r opposite the reference point R) the start button 2 may be momentarily depressed; thereupon in accordance with (2.) above the motor will begin a counterclockwise rotation of the member 30—36—35 through 360°. During the initial interval required for the valley 33s to move to opposite the reference point R none of the apertures 34 will pass that reference point, no sheet of light will impinge from the lamp 16 onto the light-sensitive element 14, and no opening of the circuit referred to in (1.) above will occur.

During the next further rotation nine of the apertures 34, unshielded by any vane, will pass the reference point R, nine successive sheets of light will impinge from lamp 16 onto element 14, and the above-mentioned circuit will be opened and reclosed nine successive times thereby to generate the nine pulses required for dialing of the first digit. During the still further rotation required for four of the apertures 34 to pass the reference point R the vane 41b will preclude the impingement of any light from 16 onto 14, thereby rendering the switching means referred to in (1.) above ineffective to open the above-mentioned circuit; this will result in an interdigital pause in the dialing.

The action described in the preceding paragraph will be progressively repeated for the dialing of, and the provision of an interdigital pause after, each of the second, third, fourth, fifth and sixth digits—subject of course to variations in the numbers of intradigital pulses in accordance with the above-described positionings of the elements 42 through 46 (and to progressive increase of the numeral designating the vane referred to).

During the still further continued rotation three of the apertures 34, unshielded by any vane, will pass the reference point R, three successive sheets of light will impinge from the lamp 16 onto the element 14, and the above-mentioned circuit will be opened and reclosed three successive times thereby to generate the three pulses required for dialing of the seventh (last) digit. In the early part of the immediately subsequent rotation the vane 48b will preclude the impingement of any light from 16 onto 14, thereby starting a period of no further pulse generation—which the vane itself could of course continue only during the passage of a limited number (e.g. four) of the apertures 34 past the reference point R.

It is when the leading edge of the arm 48a has reached the reference point R that the period of no further pulse generation is required to be started (and will be started by the vane 48b). At this time the leg 49a of the bracket 49 (above-mentioned as carried by the element 48) will have been brought to a position within four tooth-spacings clockwise from the reference point R; it is during the travel of that leg 49a from that position to one of alignment with that reference point that the dialing-completion switch 7 is to be temporarily thrown to opposite-from-normal condition—the result of which temporary throw will, in accordance with (3) above and through the agency of electrical elements yet to be described, be to render the switching means ineffective to open the above-mentioned circuit during the further rotation of the member 30—36—35. Accordingly the dialing-completion switch 7 will be so located that its roller 8a will be temporarily downwardly displaced by the bracket leg 49a during the interval of travel of that leg mentioned in the preceding sentence.

Although the temporary throw of the switch 7 to opposite-from-normal condition will foreclose any further openings of the above-mentioned circuit, and thus any further dialing, during the further rotation of the member 30—36—35 it will of course have no influence on that further rotation itself, which will accordingly continue until the projection 4 has again depressed the roller 6*a* of the run switch 5—thereby throwing that switch to opposite-from-normal condition and stopping the rotation of the motor, the apparatus then having been restored to its rest condition.

As has been made evident above, the number of teeth 32 appearing in the spans between certain points may be relied on as a guide for the effects of various positionings of the elements 41 through 46 and the element 48. The number of such teeth to be counted in any such span, however, may be as great as 10 (which is of course the number of pulses appropriate to the dialing of the digit 0), and the counting of anything approaching that number of modest-sized teeth can be both burdensome and error-ridden. I have observed that when the several elements 41 through 46 are arranged (as shown and as above described) in a stack it is readily possible to provide on each of them (other than the last-to-act, dealt with below) a series of indicia, in such a manner that that one of those indicia which appears in a predetermined relationship to the next-to-act of those elements will provide a directly legible indication of the number of circuit openings and reclosings which will occur in the interval between the actions of those respective two elements.

The provision of such indicia on the first element 41 is fully illustrated in FIG. 5. Therein it will be seen that the element 41 is provided with a portion 41*e*, of substantial arcuate length, somewhat radially extended from the main circular portion of that element (and which may permissibly be considered to overlap the more-radially-extended arm 41*a*); on this portion 41*e* there may be provided in clockwise arrangement a series of indicia "X 1 2 3 4 5 6 7 8 9 0" spaced each from the next by the same angular spacing as exists between the teeth 32. A similar radially extended portion, bearing a similar series of indicia, may also be provided on each of the elements 42, 43, 44 and 45, as partially appears in FIG. 1.

The above-mentioned predetermined relationship to the next-to-act of the elements 42 through 46 may be provided for in any convenient manner; by way of example I have shown it provided for by a hole in each of those elements, designated by the numeral of that element with an appended *f*, radially spaced from the center of rotation by the same radius as are the indicia, and typically located only slightly clockwise from the leading edge of that element's arm (e.g. 42*a*). The series of indicia on the next preceding element will then be so angularly positioned that that one of those indicia which appears in the hole will designate the number of circuit openings and closing which will occur in the interval between the actions of those respective elements.

On the plane upper surface of the gear 30 there may be provided a similar series of indicia; that one of those indicia which appears in a predetermined relationship to the element 41 will then provide a similar indication with respect to the interval preceding the action of the element 41—and that predetermined relationship may typically be provided for by a hole 41*f* in the element 41. Still further, on the element 46 there may be provided a radially extended portion 46*e* similar to the radially extended portions of earlier-to-act elements, and thereon a similar series of indicia; that one of those indicia which appears in a predetermined relationship to the element 48 will then provide a similar indication with respect to the interval following the action of the element 46—and that predetermined relationship may typically be provided for by a hole 48*f* in the element 48.

In the case of any of the several series of indicia, if the next-to-act of the disc-shaped elements be positioned so that in the hole therein (e.g. 41*f*) there appears the indicium X, then the vane (e.g. 41*b*) of that element will have been brought to a position such that no pulses will be generated immediately prior to the action of that element. For example, if the top element 48 be positioned so that in its hole 48*f* there appears the X on element 46, then the leading edge of the vane **48*b* will have been brought into substantial contact with the trailing edge of the vane 46*b* so that none of the apertures 34** is exposed between those two vanes. This feature makes it possible to adjust the apparatus, when required, for the dialing of fewer digits than the number for which it has been fundamentally designed.

Telephone practice indicates that for any commercially used seven-digit number or address the maximum number of pulses ever required would be 66; adding 24 (or 6 times 4) for six interdigit intervals of duration equal to four pulse periods each, one arrives in the case of seven-digit apparatus at a maximum number of required apertures of 90; adding 6 for the number of omitted apertures, one arrives at a maximum number of required gear teeth of 96. Accordingly for such apparatus I have preferred to use a 96-tooth gear, with intertooth—and thus, in the flange 35, interaperture-center—spacings each of 3.75°. A desirable pulse period (or total length of pulse and interval) is 0.1 second, from which one arrives at approximately 9.6 seconds as a desirable period for one complete rotation of the member 30—36—35, or at a desirable speed of rotation of approximately 6.25 r.p.m.; in practice a motor-and-reduction-gear assembly having a rated output-shaft speed of 6 r.p.m. has proved eminently satisfactory.

This completes the description of the mechanical organization shown in FIGS. 1 through 5 and of its operation—many aspects of both of which may, however, be widely varied without departure from the spirit of my invention. I may mention in particular that there is no requirement for the apertures 34 to be radially aligned with the teeth 32 (i.e. to be disposed vertically below respective gear teeth)—it being obviously possible to compensate for a digression from that specification, as for example by a compensating digression from centrality of location of the pins 51—56 and 58 from the angular centers of the respective arms and vanes. It may also be mentioned that the terms "front" and "back" in the foregoing description have been used as a matter of arbitrary convenience, and they imply no limitation whatever as to the orientation in which the apparatus as a unit may be assembled into its environment.

Figure 6:
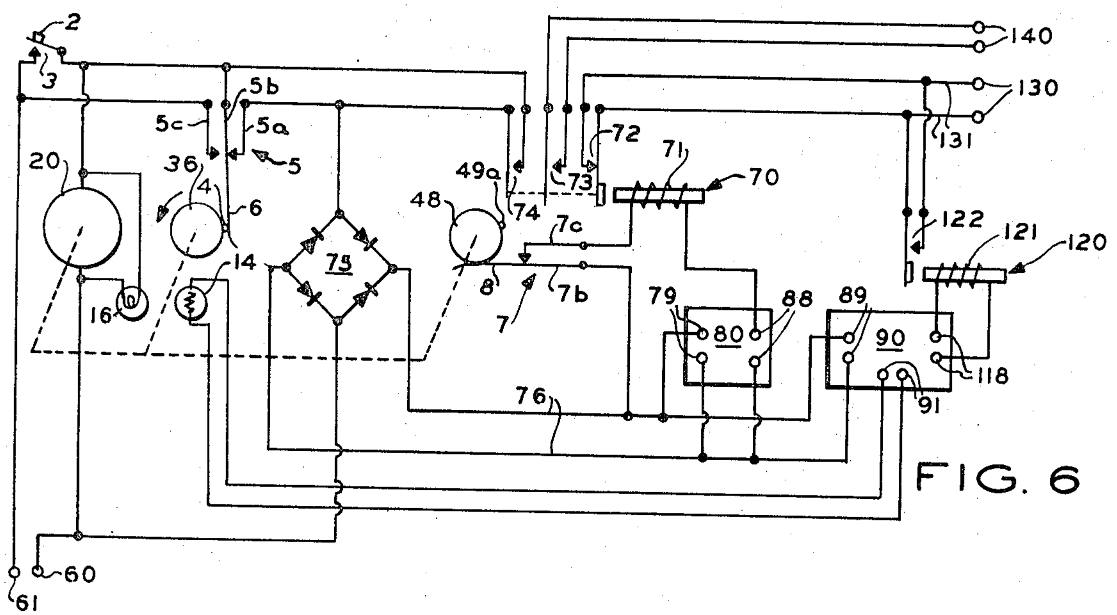
FIG. 6 is a schematic diagram of electrical apparatus and circuitry for use with the mechanical organization of FIGS. 1—5.

Reference may now be had to FIG. 6 for a showing of a preferred embodiment of electrical apparatus and circuitry which may be used with the mechanical organization of FIGS. 1 through 5. In FIG. 6 there appear in wholly schematic forms certain elements of those earlier FIGS.—e.g. start switch 3 and button 2; motor 20, ring 36 (with projection 4) and element 48 (with bracket leg **49*a*), all subject to rotation in common; run switch 5 and its lever 6; dialing-completion switch 7 and its lever 8; light-sensitive element 14; and lamp 16**. There may be mentioned as a preferred form of that light-sensitive element a light-sensitive resistor, for example of the cadmium-sulfide type.

The normally-open start switch 3 and the normally-closed contacts **5*b*—5*c* of the run switch 5 (which are held open when the member 30—36—35 is in zero position) may be connected in parallel with each other, and through their combination the upper-shown terminal of the motor 20 may be connected to the line terminal 61—the lower-shown terminal of the motor being connected to the other line terminal 60, and the lamp 16 being connected in parallel with the motor. An electromagnetic relay 70 is provided having three pairs of contacts, one of which is a normally-open pair 74 which in manner hereinafter apparent serve as holding contacts for the coil 71 of that relay. The contacts 74 may be connected in parallel with the normally-open contacts 5*a*—5*b* of the run switch 5 (which are held closed when the member 30—36—35 is in zero position), and through their combination there may be connected across the motor 20 the AC input terminals of a full-wave bridge rectifier 75; a pair of conductors 76** may be connected across the DC output terminals of that rectifier.

The coil 71 of relay 70 may be connected across the conductors 76 through the normally-closed contacts *7b*—*7c* of the dialing-completion switch 7, and through the output terminals 88 of a time-delay circuit 80 hereinafter more fully described. Across the conductors 76 there may also be connected a pair of power-input terminals 79 of the circuit 80, as well as the power-input terminals 89 of a monostable multivibrator 90 hereinafter more fully described. That multivibrator is further provided with triggering-input terminals 91 across which the light-sensitive element 14 is connected, and with output terminals 118 which, along with other pairs of contacts on the relay 70, will be hereinafter referred to.

FIG. 6 illustrates the conditions of its switches and relay which will obtain when the member 30—36—35 is in zero position. Upon a closure of the start switch 3 for a quite minor fraction of a second the motor 20 will forthwith begin to operate and the ring 36 to rotate, quickly moving the projection 4 to result in the throw of the run switch 5 to its normal condition—and thus in the closure of its contacts *5b*—*5c*, which will insure the continued operation of the motor throughout the cycle of 360° rotation of the member 30—36—35. Coincidentally with the start of motor operation the rectifier 75 will be energized through the then still-closed contacts *5a*—*5b* and its DC output will be applied across the coil 71 to energize the relay 70, subject to a delay (typically of the order of 25 milliseconds) imposed by the time-delay circuit 80; that delay and the operating time of the relay, taken together, will be less than the interval required for the throw of switch 5 following motor start. The operation of the relay 70 resulting from its energization will close its holding contacts 74, so that the quickly ensuing opening of the contacts *5a*—*5b* attendant on the throw of switch 5 will not interrupt the energization of the rectifier 75 or of the relay 70. That relay will remain energized until the element 48 has rotated to the point where bracket leg *49a* through lever 8 temporarily throws the dialing-completion switch to open its contacts *7b*—*7c*; this interrupts the supply of power to the coil 71 to result in the deenergization of relay 70 and the opening of its holding contacts 74—whereupon, in view of the now-open condition of contacts *5a*—*5b*, the rectifier 75 and thus the relay 70 become incapable of reenergization during the remainder of the cycle. The motor operation will not, however, be thereby interrupted and that operation will continue throughout the remainder of the cycle.

Forthwith upon closure of the start switch 3 and the energization of the rectifier 75 the power-input terminals 89 of the multivibrator 90 will be energized. By reason of the circuitry within the multivibrator, its output terminals 118 will then begin to supply power to such load as may be connected across them, and that supply of power will continue throughout the continued energization of the rectifier 75—excepting during interruption intervals each of the general order of 50 milliseconds, which respectively immediately follow triggerings of the multivibrator.

A pair of terminals 130 are provided between which lies a local circuit 131 closed, when the apparatus is in rest condition, by a pair of normally-closed contacts provided on the relay 70. In parallel with the contacts just mentioned, which are designated as 72, there may be a pair of normally-open contact 122 provided on an electromagnetic relay 120 whose coil 121 is connected across the multivibrator output contacts 118. The relay 120 will be energized forthwith upon closure of the start switch 3 and energization of the rectifier 75, and the contacts 122 will be closed almost forthwith—and definitely before the opening of the contacts 72, it being to insure this sequence that the time-delay circuit 80 is provided. Thus the local circuit 131 will be closed not only before but also during the energization of the rectifier 75—excepting only during the interruption intervals mentioned in the preceding paragraph. At the conclusion of the rectifier energization the circuit 131 will remain closed—the deenergization of the relay 70 then necessarily preceding (since it invokes) the deenergization of the relay 120.

The terminals 130 will be connected to the telephone line; the openings and closings of the circuit 131 which respectively occur at the beginning and ending of the interruption intervals above referred to will then effect dialing over that telephone line. (To duplicate the shorting-out of the telephone receiver or earpiece which is ordinarily provided for during dialing there may be provided a pair of terminals 140 for connection across that receiver, and across those terminals there may be connected a pair of normally-open contacts 73 provided on the relay 70.) It is particularly to be noted that essentially as soon as the dialing has been completed—and without any hiatus while the member 30—36—35 completes its cycle of rotation—the circuit 131 is restored to its normal condition by the deenergization of the rectifier 75, permitting conversation over the telephone line to proceed without delay.

Figures 7, 8, 9:
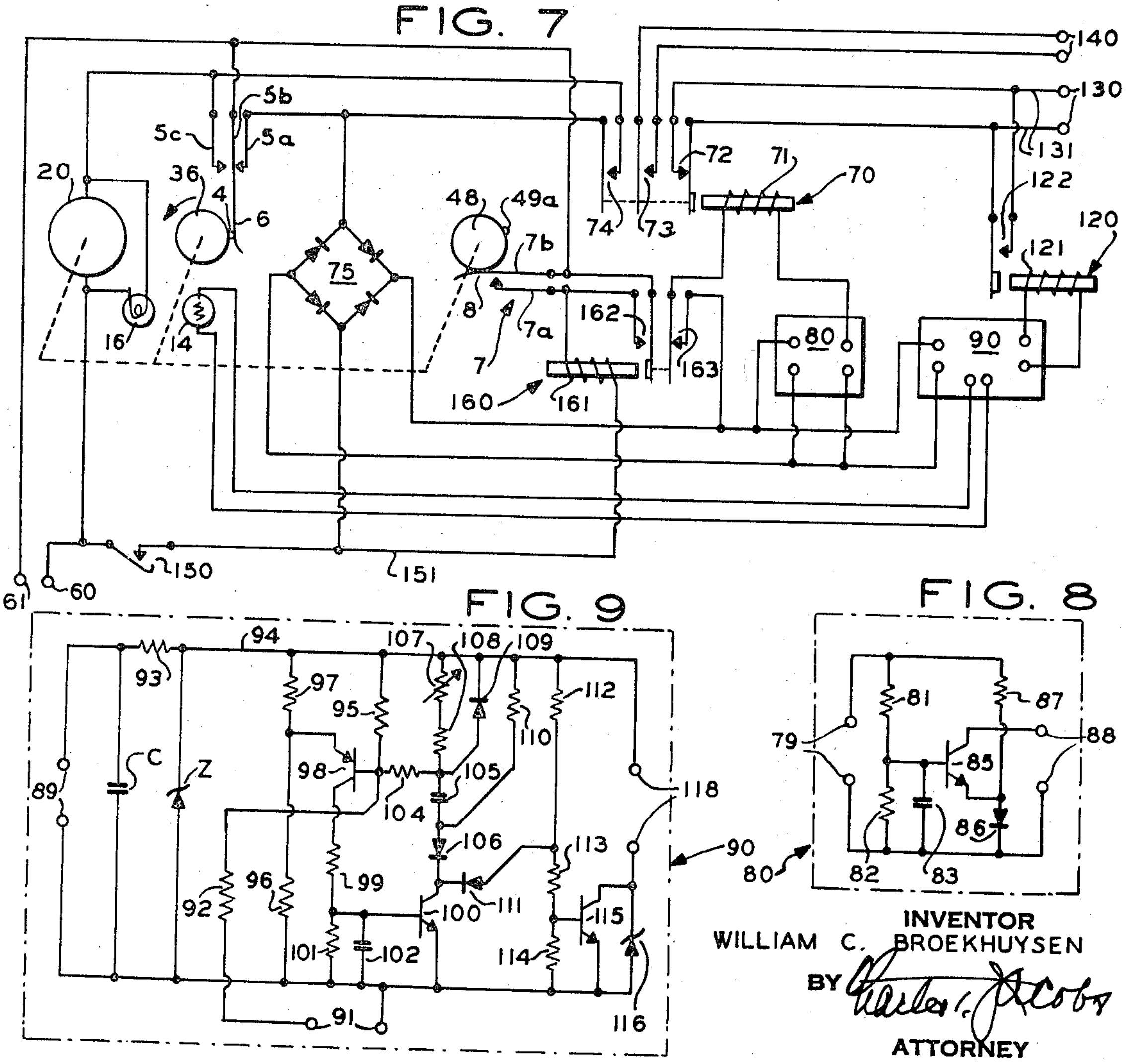
FIG. 7 is a diagram of nature similar to FIG. 6 but showing a modification adapted for "off the hook" starting of the apparatus.
FIG. 8 is a schematic diagram of a time-delay circuit 80 which appears merely in block form in each of FIGS. 6 and 7.
FIG. 9 is a schematic diagram of a monostable multivibrator 90 which appears merely in block form in each of FIGS. 6 and 7.

FIG. 8 illustrates a typical time-delay circuit 80. Across the power-input terminals 79 there may be connected as a voltage-divider two resistors 81 and 82 in series with each other, and across the lower resistor 82 a capacitor 83 may be connected. Across 82 and 83 there may be serially connected the base-emitter path of an n–p–n transistor 85, and a diode 86; a resistor 87 may be connected from the upper terminal 79 to the junction of 85 and 86 to insure a drop across 86 of the order of 0.7 volt. The collector of transistor 85 may be connected to the upper output terminal 88, and the lower output terminal 88 may be connected to the lower power-input terminal 79. The delay is provided by the time required for the capacitor 83 to charge sufficiently to render the base-emitter path of 85 conductive, during which time the collector-emitter path of 85 will remain nonconductive—but after which that collector-emitter path, which along with diode 86 lies between the output terminals 88, will be fully conductive.

FIG. 9 illustrates a typical multivibrator for use as 90. Since well-stabilized DC power is desirable for it, the multivibrator is shown as including a filter capacitor C connected across its power-input terminals 89, and across that capacitor a resistor 93 and Zener diode Z in series with each other—the actual power to the multivibrator being taken off from between a conductor 94 connected to the jucntion of 93 and Z, and the lower power-input terminal 89, which for convenience is hereinafter referred to as mv-ground.

Between the supply conductor 94 and mv-ground there are connected in consecutive series a resistor 97, the emitter-collector path of a p–n–p transistor 98, a resistor 99 and the base-emitter path of an n–p–n transistor 100. A resistor 95 may be connected from the base of 98 to the supply conductor 94, and a resistor 96 may be connected from the emitter of 98 to mv-ground; the base-emitter path of 100 may be shunted by a resistor 101 (and by a small capacitor 102 for the minimization of stray transient effects). Between the base of transistor 98 and the collector of transistor 100 there are connected in consecutive series a resistor 104, a capacitor 105 and a diode 106. From the supply conductor 94 to the junction of 104 and 105 there may be connected in consecutive series a variable resistor 107 and a fixed resistor 108, and a reversely-poled diode 109 may shunt those tow elements; from the supply conductor 94 to the junction of 105 and 106 there may be connected a resistor 110. Between the base of 98 and mv-ground there may be connected in consecutive series a resistor 92 and the triggering-input terminals 91—across which latter the light-sensitive element 14 is externally connected.

Normally the transistor 98 will be nonconductive, resulting in nonconductivity of the transistor 100 as well; the capacitor 105 will be discharged, with both its plates at the potential of the supply conductor 94. At the onset of impingement of a sheet of light from lamp 16 onto element 14 the resistance of that element will be abruptly lowered, thereby abruptly lowering the total resistance (that of 92 and 14) between the base of transistor 98 and mv-ground to result in that transistor and transistor 100 both becoming conductive. The conductivity of 100 will result in both plates of the capacitor 105 being brought down in potential to near the potential of mv-ground, and forthwith the capacitor 105 will start to charge from conductor 94 through the available paths, including both that of resistors 107—108 and the base-emitter path of 98 together with resistors 97 and 104—during the process of which charging the resistance of the element 14 will have been restored to its normal high value as a result of the cessation of light impingement onto element 14. After an interval whose magnitude will be determined among other things by the adjustment of the variable resistor 107—an interval typically of the order of 50 milliseconds—the potential of the upper plate of capacitor 105, and thus that of the base of transistor 98, will have become high enough so that that transistor and with it the transistor 100 will resume the normal nonconductive state.

An output n—p—n transistor 115 may be provided in the multivibrator 80, with its collector-emitter path connected between the lower output terminal 118 and mv-ground (and preferably shunted by a Zener diode 116 for the minimization of reverse transients from the relay 121 which might injure that transistor); the upper output terminal 118 may be connected to the supply conductor 94. Between that supply conductor and mv-ground there may be connected in consecutive series three resistors 112, 113 and 114; the base of transistor 115 may be connected to the junction between 113 and 114, and the junction between 112 and 113 may be connected to the collector of transistor 100 through a diode 111.

In the normal state of nonconductivity of transistor 100 the output transistor 115 will of course be conductive, resulting in the relay coil 121 then being energized as above described. On the other hand during intervals of conductivity of transistor 100 the output transistor 115 will, by diversion of base-current flow, be rendered nonconductive; its intervals of nonconductivity are of course the interruption intervals referred to above.

Apparatus of the type above disclosed may be alternatively arranged for operation in response merely to the removal of the telephone handset from its hook—e.g. in response to the closure of the conventional hook-switch present in the stationary portion of the telephone instrument. Two problems not reached in the circuitry of FIG. 6 must then be coped with. One of them is the need to provide a few seconds delay, after the hook-switch closure, during which the dial tone (indicating readiness of the telephone line for dialing) can be relied on to appear. The other problem arises from the fact that after closure the closed condition of the hook-switch will of course persist not merely through the dialing process, nor even merely through a cycle of member 30—36—35 rotation, but until the end of the telephone conversation; this in terms of the FIG. 6 circuit would be analogous to a holding of the start switch 3 closed even after the completion of the 360° rotation—and that would of course result in an unwanted and intolerable restarting of the sequence of operations. It is therefore necessary to introduce into the system another logic element which in an ultimate sense will annul the effect of the continued closure of the hook switch. FIG. 7 illustrates a modified circuit in which both these problems are suitably coped with.

In FIG. 7 (from which the start switch 3 is of course absent) the hook-switch is shown as 150, interposed between the line terminal 60 and a conductor 151 to which the bottom input terminal of rectifier 75 is connected; the path of current to the motor 20 does not pass through the hook-switch. The contact *5b* is connected to terminal 61 and the contact *5c* to the upper motor terminal. The holding contacts 74 of the relay 70 are now connected between the contacts *5a* and *5c*, so that while the apparatus remains in rest condition (with *5a*—*5b* closed) a closure of those holding contacts becomes the sole action by which operation of the motor may be started.

Upon closure of the hook-switch 150 and energization of the rectifier 75 through contacts *5a*—*5b* the action of the time-delay circuit 80 will be initiated. In this embodiment the delay imposed by that circuit is made much greater than in FIG. 6; typically it may be of the order of 3 seconds, which is ordinarily ample to allow for the appearance of the dial tone. At the conclusion of the delay so imposed the coil 71 of the relay 70 will be energized and that relay will be operated, closing the contacts 74 and thus starting the motor 20—whose very initial rotation will result, as in FIG. 6, in the opening of contacts *5a*—*5b* and the closing of contacts *5b*—*5c*. The closing of the latter contacts of course provides for continued motor operation throughout the cycle; the opening of *5a*—*5b* will not affect the energization of the rectifier 75, which proceeds through the now-closed contacts *5b*—*5c* and the contacts 74.

The additional logic element mentioned above as introduced into the circuit of FIG. 7 may be a relay 160 having an AC-energizable coil 161; this, in series with a certain contact arrangement about to be mentioned, may be connected between the line terminal 61 and the conductor 151. That contact arrangement is of two pairs of contacts in parallel; one may be a pair of normally-open relay-160-holding contacts 162 provided in that relay, and the other may be a pair of normally-open contacts *7a*—*7b* in the dialing-completion switch 7 (used in place of the normally-closed pair *7b*—*7c* in that switch in FIG. 6). The relay 160 may be provided with a further pair of normally-closed contacts 163, and these may be connected in series with the coil 71 of relay 70 (in substitution for the contacts *7b*—*7c* as in FIG. 6).

Neither the closure of the hook-switch 150 nor the later starting of the motor will result in any energization of the relay 160, since each of the contact pairs in the above-mentioned arrangement will be open. When the motor operation has proceeded to the point where the bracket arm *49a* temporarily depresses the lever 8 of switch 7, however, the contacts *7a*—*7b* will be closed to result in energization of the relay 160, the opening of its contacts 163, and the closure of its holding contacts 162—the closure of 162 serving to hold the relay 160 energized, and the contacts 163 open, until the next subsequent opening of the hook-switch 150. Until that time the continued open condition of the contacts 163 will altogether foreclose any energization of the relay 70 or closure of its contacts 74—which in turn will altogether foreclose any restarting of the motor once it has been stopped (at the end of the 360° cycle) by the opening of contacts *5b*—*5c* even though the contacts *5a*—*5 b* are thereupon closed.

With respect to the structure of FIGS. 1 through 5, it may be mentioned that the insulating board 1 provides a convenient base on which to mount, for example to a substantial extent in printed-circuit form, the circuitry shown in either of FIGS. 6 and 7—as typified by a few of the electrical elements which are shown so mounted.

While I have shown and described my invention in terms of specific embodiments thereof, it will be understood that I intend thereby no unnecessary limitations. Modifications in many respects will be suggested by my disclosure to those skilled in the art, and such modifications will not necessarily constitute a departure from the spirit of the invention or from its scope, which I undertake to define in the following claims.

I claim:

1. In automatic telephone-dialing apparatus, the combination of a rotatable member; means, connected with said member, operable to cause a rotation thereof at uniform angular velocity; a series of indices arcuately arranged on said member about its center of rotation, the angular spacing of each successive index in the series from its predecessor being a uniform small angle; an electrical circuit; switching means connected in, and operable to open and reclose, said circuit; means, free of mechanical actuating connection with said member and said rotation-causing means and said indices but under the control of said indices, for operating the switching means once per passage of one of said indices past a predetermined fixed reference point adjacent the locus of index travel; and a plurality of means coupled to said member each for rendering said means for operating the switching means ineffective throughout the passage of a respective preselected group of successive said indices past said reference point.

2. The subject matter claimed in claim 1 further including means for stopping said rotation when said member has completed a rotation of 360° from a predetermined angular position of start.

3. The subject matter during in claim 2 wherein said indices are so arranged that during an initial portion of said 360° rotation none of said indices travels past said reference point.

4. The subject matter claimed in claim 1 wherein each said group is of a uniform small number of indices.

5. The subject matter claimed in claim 1 further including means actuable during the rotation of said member to render said means for operating the switching means ineffective throughout the further rotation of said member, and means coupled to said member for actuating said actuable means subsequently to the action of the last-to-act of said plurality of means. power 6. The subject matter claimed in claim 5 wherein said actuable means comprises a relay having a coil and having a pair of normally open holding contacts which are closed at the start of rotation of said member and through which power is then supplied to said coil, and wherein said actuating means comprises means for causing an interruption of the supply of power to said coil.

7. The subject matter claimed in claim 1 wherein the coupling of each of said plurality of means to said member is angularly variable whereby to alter the number of openings and reclosings of said circuit which will occur during the intervals of member rotation respectively preceding the actions of the several ones of said plurality of means.

8. The subject matter claimed in claim 7 further including means actuable during the rotation of said member to render said means for operating the switching means ineffective throughout the further rotation of said member, and means coupled to said member for actuating said actuable means, the coupling of said actuating means to said member being angularly variable whereby to alter the number of openings and reclosings of said circuit which will occur after the action of the last-to-act of said plurality of means.

9. The subject matter claimed in claim 8 wherein said actuating means includes means for rendering said means for operating the switching means ineffective during the passage of a predetermined small number of successive said indices past said reference point immediately preceding the actuation of said actuable means.

10. The subject matter claimed in claim 8 wherein said rotatable member is provided with detents angularly spaced from each other by said uniform small angle and defining the angular relationships in which each of said plurality of means, and said actuating means, may be coupled to said member.

11. The subject matter claimed in claim 1 wherein said plurality of means comprises a plurality of generally disc-shaped elements arranged in a stack, each of said elements having a radially extended arm of short arcuate length and having means on said arm to render said switching means ineffective.

12. The subject matter claimed in claim 1 wherein said plurality of means comprises a plurality of generally disc-shaped elements arranged in a stack, each of said plurality of elements having a radially extended portion bearing consecutive indicia arcuately spaced each from the next by said uniform small angle, that indicium on each of said elements other than the last-to-act which appears in a predetermined relationship to the next-to-act element providing an indication of the number of openings and reclosings of said circuit which will occur in the interval between the actions of those respective two elements.

13. The subject matter claimed in claim 12 wherein said rotatable member is provided with a plane surface against which said elements are stacked, said surface bearing consecutive indicia arcuately spaced each from the next by said uniform small angle, that one of said indicia which appears in a predetermined relationship to the first-to-act of said elements providing an indication of the number of openings and reclosings of said circuit which will occur before the action of said first-to-act element.

14. The subject matter claimed in claim 12 further including a further generally disc-shaped element comprised in said stack in an angular position determining the number of openings and reclosings of said circuit which will occur following the action of the last-to-act of said plurality elements, that indicium on said last-to-act element which appears in a predetermined relationship to said further element providing an indication of said last-mentioned number.

15. The subject matter claimed in claim 1 wherein said means for operating the switching means comprises a light-responsive element controlling the switching means and means for illuminating said element, and wherein said rotatable member includes a shield between said element and said illuminating means, said shield being provided with a series of apertures spaced each from the next by said uniform small angle.

16. The subject matter claimed in claim 15 wherein each of said plurality of means comprises a vane covering a respective preselected small group of successive said apertures.